United States Patent
Higuchi et al.

(10) Patent No.: US 11,816,050 B2
(45) Date of Patent: Nov. 14, 2023

(54) SEMICONDUCTOR DEVICE

(71) Applicant: RENESAS ELECTRONICS CORPORATION, Tokyo (JP)

(72) Inventors: Koki Higuchi, Tokyo (JP); Tsutomu Matsuzaki, Tokyo (JP); Masafumi Inoue, Tokyo (JP); Masakatsu Uneme, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 17/318,669

(22) Filed: May 12, 2021

(65) Prior Publication Data

US 2021/0390067 A1 Dec. 16, 2021

(30) Foreign Application Priority Data

Jun. 10, 2020 (JP) .................................. 2020-100695

(51) Int. Cl.
*G06F 13/362* (2006.01)
*G06F 13/40* (2006.01)

(52) U.S. Cl.
CPC ........ *G06F 13/362* (2013.01); *G06F 13/4031* (2013.01)

(58) Field of Classification Search
CPC ........................... G06F 13/362; G06F 13/4031
See application file for complete search history.

(56) References Cited

U.S. PATENT DOCUMENTS

| 6,715,042 | B1 | | 3/2004 | Mirza et al. | |
|---|---|---|---|---|---|
| 8,065,458 | B2 | * | 11/2011 | Nagao | G06F 13/364 710/244 |
| 8,959,266 | B1 | * | 2/2015 | Bonen | G06F 13/1605 710/5 |
| 9,483,282 | B1 | * | 11/2016 | Vandervennet | G06F 9/4411 |
| 9,898,432 | B2 | * | 2/2018 | Takano | G06F 13/362 |
| 11,240,157 | B1 | * | 2/2022 | Callaghan | H04L 69/22 |
| 2003/0140201 | A1 | * | 7/2003 | Takizawa | G06F 13/1605 711/151 |
| 2005/0240707 | A1 | * | 10/2005 | Hayashi | G06F 13/364 710/309 |
| 2006/0059284 | A1 | | 3/2006 | Saen et al. | |
| 2007/0118698 | A1 | * | 5/2007 | LaFrese | G06F 11/2074 711/141 |

(Continued)

FOREIGN PATENT DOCUMENTS

JP 2011-059915 A 3/2011

OTHER PUBLICATIONS

Extended European Search Report issued in corresponding European Patent Application No. 21178351.9-1224, dated Nov. 12, 2021.

(Continued)

*Primary Examiner* — Brian T Misiura
(74) *Attorney, Agent, or Firm* — McDermott Will & Emery LLP

(57) ABSTRACT

A semiconductor device is configured so that two or more master devices access a slave device via a bus. The semiconductor device includes: a priority generation circuit that generates a priority based on a transfer amount between a specific master device and a specific slave device; and an arbitration circuit that performs an arbitration based on the priority when competition of the accesses occurs.

5 Claims, 10 Drawing Sheets

(56) References Cited

U.S. PATENT DOCUMENTS

| | | | | |
|---|---|---|---|---|
| 2009/0119430 A1* | 5/2009 | Tsujimoto | ............. | G06F 13/364 |
| | | | | 710/110 |
| 2010/0223409 A1* | 9/2010 | Minami | ................ | G06F 13/362 |
| | | | | 710/110 |
| 2015/0234747 A1* | 8/2015 | Tanaka | ................ | G06F 12/0862 |
| | | | | 711/125 |

OTHER PUBLICATIONS

Japanese Office Action issued in corresponding Japanese Patent Application No. 2020-100695, dated Aug. 22, 2023, with English translation.

* cited by examiner

SEMICONDUCTOR DEVICE

CROSS-REFERENCE TO RELATED APPLICATIONS

The present application claims priority from Japanese Patent Application No. 2020-100695 filed on Jun. 10, 2020, the content of which is hereby incorporated by reference to this application.

BACKGROUND

The present disclosure relates to a semiconductor device, and is applicable to, for example, a semiconductor device including a master, a slave, and an arbitration circuit.

In a common bus to which a plurality of bus masters and bus slaves are connected, when the bus master issues a data transfer access request to the bus slave, access permission to the bus slave is issued for each bus master by a time division. At this time, if the access requests of the plurality of bus masters are competitive, the arbitration for issuing the access permission to the bus masters is required.

There are disclosed techniques listed below.
[Patent Document 1] Japanese Unexamined Patent Application Publication No. 2011-59915

SUMMARY

According to one aspect of the present disclosure, in a semiconductor device, two or more masters access a slave via a bus. The semiconductor device includes: a priority generation circuit that generates a priority according to a transfer amount between the master and the specific slave; and an arbitration circuit that performs an arbitration according to the priority when access competition occurs.

According to the above semiconductor device, the priority can be generated according to the transfer amount between the master and the specific slave. Consequently, the priority can be increased until the transfer with the specific slave exceeds the constant amount, and priority control for performing the constant amount of transfer within the unit period can be performed.

DETAILED DESCRIPTION

Figure 1:
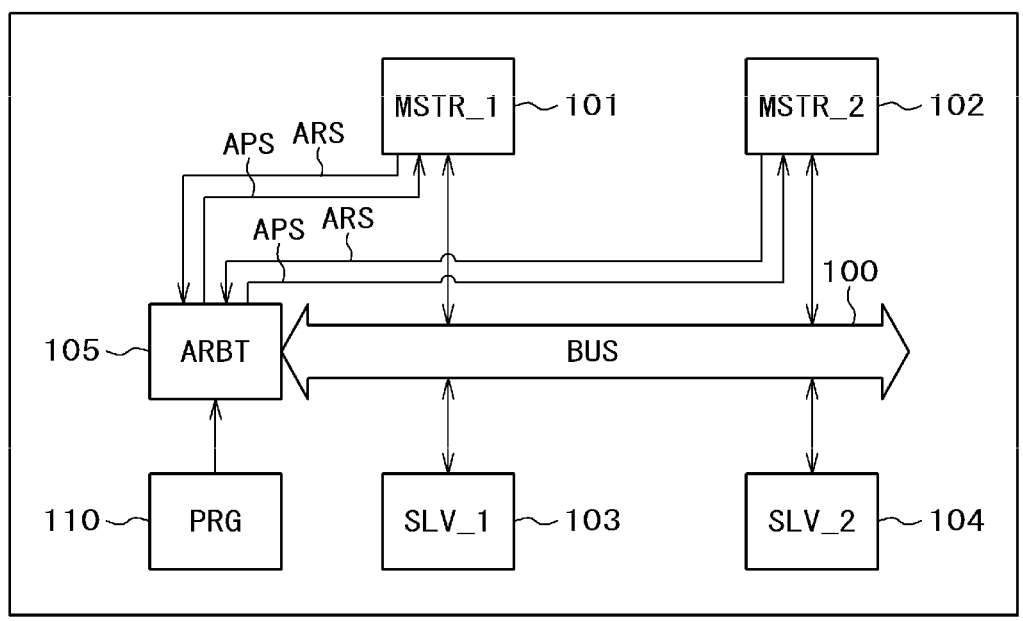
FIG. 1 is a conceptual diagram of a configuration of a semiconductor device according to an embodiment.

Hereinafter, embodiments and examples will be described with reference to the drawings. However, in the following description, the same components may be denoted by the same reference numeral, and a repetitive description thereof may be omitted. Incidentally, in order to clarify the explanation, the drawings may schematically represent the width, thickness, and shape, etc. of each part as compared with the actual embodiment, but this is just an example and does not limit the interpretation of the present disclosure.

In this specification, "master" and "slave" mean "master device/circuit" and "slave device/circuit" respectively.

Figure 2:
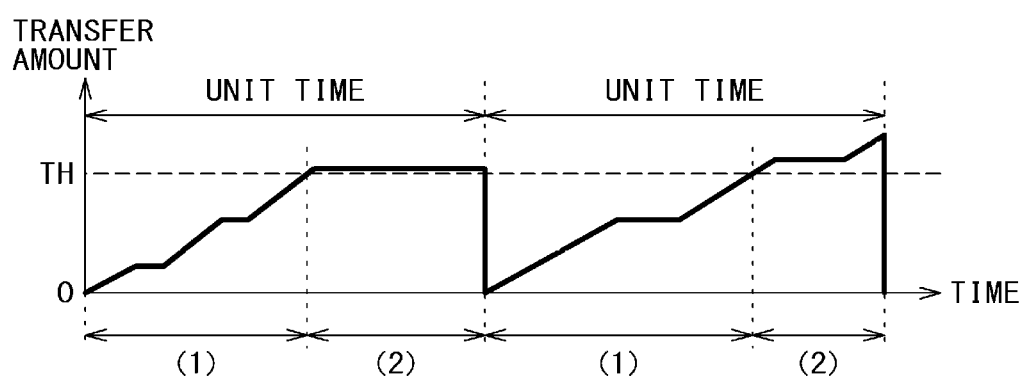
FIG. 2 is a diagram showing an image of switching a priority depending on a transfer amount of the semiconductor device shown in FIG. 1.

First, an embodiment will be described with reference to FIGS. 1 and 2. FIG. 1 is a conceptual diagram of a configuration of a semiconductor device according to an embodiment. FIG. 2 is a diagram showing an image of switching a priority depending on a transfer amount of the semiconductor device shown in FIG. 1.

As shown in FIG. 1, a semiconductor device 10 according to an embodiment includes a first master (MSTR_1) 101, a second master (MSTR_1) 102, a first slave (SLV_1) 103, and a second slave (SLV_2) 104 that are connected to the bus 100. The first master (MSTR_1) 101 is, for example, a device such as an image processing controller that is required to process packets per unit time. The first slave (SLV_1) 103 is a memory device such as an SRAM that the first master 101 accesses to perform a packet processing per unit time. The second master (MSTR_2) 102 is a device such as a CPU and a DMAC. The second slave (SLV_2) 104 is a slave other than the first slave 103. The semiconductor device 10 further includes an arbitration circuit (ARBT) 105 and a priority generation circuit (PRG) 110. The priority generation circuit 110 generates a priority. The arbitration circuit 105 issues use permission to the bus 100 based on the priority.

As shown in FIG. 2, the priority generation circuit 110 switches a priority of a bus access according to a transfer amount as follows:

(1) the transfers of the first master 101 and the first slave (SLV_1) 103 are prioritized until a constant amount (TH) of transfer is completed; and (2) after the constant amount (TH) of transfer is completed, a transfer of a path other than the first master 101 and the first slave (SLV_1) 103 is prioritized.

Incidentally, as shown in FIG. 2, a period of the transfer of the above (2) follows a period of the transfer of the above (1) within a unit time, so that when the period of the transfer of the above (1) becomes long, the period of the transfer of the above (2) becomes short.

Two or more masters in the semiconductor device of the embodiment access the slave via the bus. The semiconductor device includes a priority generation circuit that generates the priority according to the transfer amount between the master and the specific slave, and an arbitration circuit that performs an arbitration according to the priority when competition of the accesses occurs. Here, the specific slave is specified based on access attribute information such as an address or security information. According to the embodiment, the master leads to certainly performing the constant amount of transfer with the specific slave.

First Example

A configuration of a semiconductor device according to a first example will be described with reference to FIG. 3.

Figure 3:
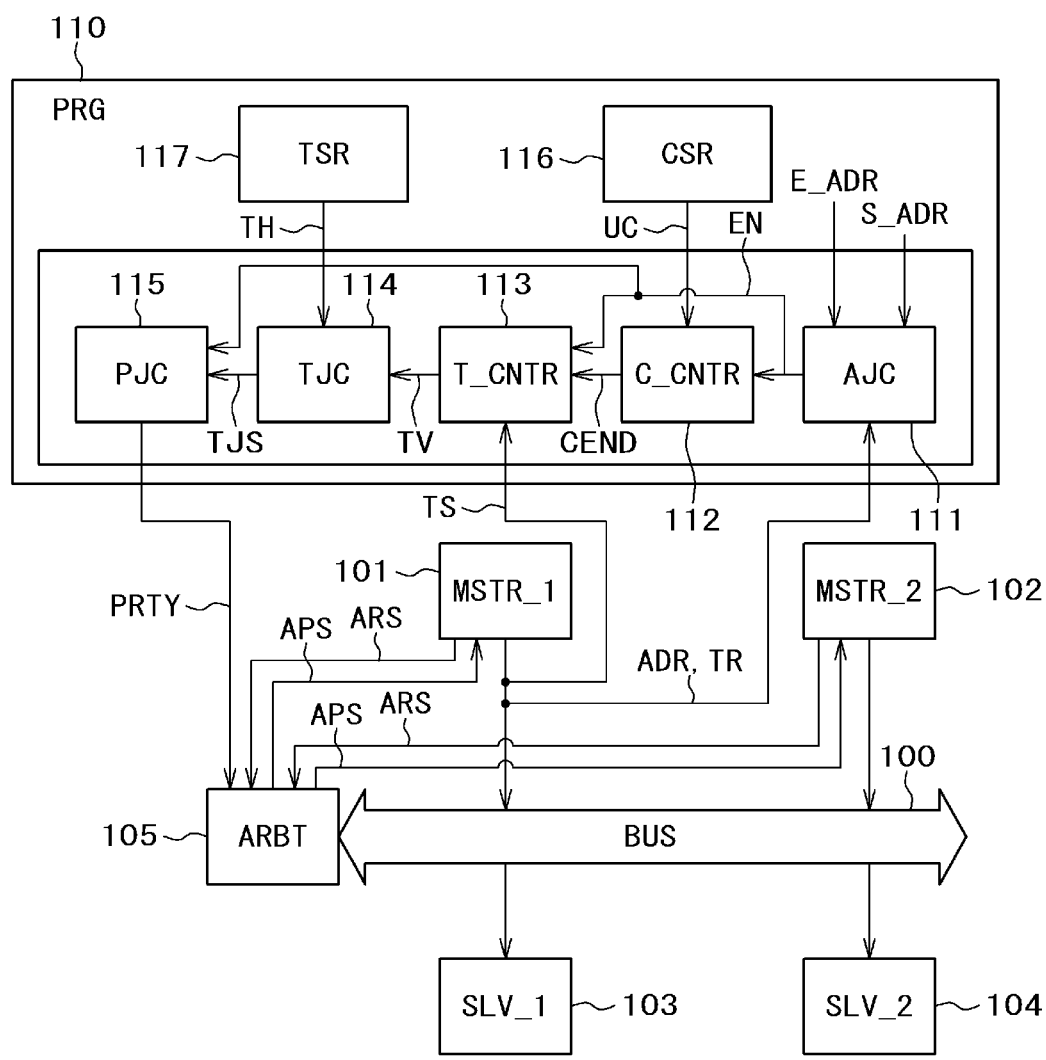
FIG. 3 is a block diagram showing a configuration of a semiconductor device according to a first example.

FIG. 3 is a block diagram showing a configuration of a semiconductor device according to a first example.

A semiconductor device 10 includes a first master (MSTR_1) 101, a second master (MSTR_2) 102, a first slave (SLV_1) 103, and a second slave (SLV_2) 104 in one semiconductor chip. The semiconductor device 10 further includes a bus 100, an arbitration circuit (ARBT) 105, and a priority generation circuit (PRG) 110 on the semiconductor chip. Here, priority control due to a transfer amount is performed between the first master 101 and the first slave 103 as a specific slave.

The first master 101 and the second master 102 output access request signals (ARS) to request accesses to the arbitration circuit 105. In contrast, the arbitration circuit 105 issues an access permission signal (APS) to the first master 101 or the second master 102 to give it to use permission of the bus 100. The first master 101 or second master 102 to which the use permission is given accesses the first slave 103 or second slave 104 via the bus 100. The first master 101 to which the access is permitted inputs an address (ADR) as a bus protocol signal, a signal indicating transferring with the slave (TR), and transfer size information (TS) into the priority generation circuit 110. The priority generation circuit 110 generates a priority and inputs it to the arbitration circuit 105.

Hereinafter, a circuit configuration in the priority generation circuit 110, its operation, and an operation of the arbitration circuit 105 will be described.

The priority generation circuit 110 includes an area determination circuit (AJC) 111, a cycle counter (C_CNTR) 112, a transfer amount counter (T_CNTR) 113, a threshold value determination circuit (TJC) 114, and a priority determination circuit (PJC) 115.

The area determination circuit 111 determines whether a transfer address (ADR) indicates an address of the first slave 103 based on the transfer address (ADR) and a start address (S_ADR) and end address (E_ADR) of the first slave 103. Here, the transfer address (ADR) is address information when the first master 101 performs the transfer to the slave. Further, the start address (S_ADR) and the end address (E_ADR) of the first slave 103 are fixed values. That is, the area determination circuit 111 compares the transfer address (ADR) with the start address (S_ADR) and end address (E_ADR) of the first slave 103, and determines whether the following conditions are satisfied:

S_ADR≤ADR≤E_ADR.

When the transfer address (ADR) indicates the address of the first slave 103 and a during-transfer signal (TR) that is another input is asserted, the area determination circuit 111 asserts an enable signal (EN). However, a set of the start address (S_ADR) and the end address (E_ADR) may be two or more in number.

Incidentally, only the start address (S_ADR) may be set and the following may be used as an assert condition of the enable signal (EN):

S_ADR≤ADR

Further, only the end address (E_ADR) may be set, and the following may be used as an assert condition of the enable signal (EN):

ADR≤E_ADR.

The cycle counter (C_CNTR) 112 presets, as an initial value of the counter, a unitary unit cycle number (UC) inputted from a cycle setting register (CSR) 116. Thereafter, the cycle counter 112 starts a down count by a first assertion of the enable signal (EN) which is another input signal. When the count value becomes 0, the cycle counter 112 presets the unitary unit cycle number again in the next cycle and repeats the down count. The cycle counter 112 repeatedly asserts a count end flag (CEND) every time the count value becomes 0. This makes it possible to grasp that a unit time has elapsed.

A transfer amount counter 113 increments transferred data amount to the counter based on transfer size information (TS) each time the enable signal (EN) is asserted. Then, the transfer amount counter 113 outputs, as a transfer amount (TV), a value of the counter. When the count end flag (CEND) that is another input signal is asserted, the transfer amount counter 113 initializes the count value to 0.

The threshold value determination circuit (TJC) 114 compares the transfer amount (TV) with a threshold value (TH) set by the threshold value setting register (TSR) 117, and asserts the threshold determination signal (TJS) when the transfer amount (TV) is smaller than the threshold value (TH).

The priority determination circuit 115 outputs "1" indicating that the priority of the first master 101 is high as a priority (PRTY) when both of the enable signal (EN) and the threshold value determination signal (TJS) are asserted. When one or both of the enable signal (EN) and the threshold value determination signal (TJS) is negated, the priority determination circuit 115 outputs "0" indicating that the priority of the first master 101 is low as a priority (PRTY).

The arbitration circuit 105 performs the arbitration when the first master 101 and the second master 102 simultaneously issue access requests to the same slave. When the accesses to the first slave (SLV_1) 103 are competitive and the priority (PRTY) of the input signal is "1", the arbitration circuit 105 preferentially issues the access permission to the first master 101. When the priority (PRTY) is "0", the arbitration circuit 105 issues the access permission to the second master 102 or the access permission by a round robin method. Here, in the round robin method, the access permission is issued to the master, which has not used the bus most recently, out of the first master 101 and the second master 102. The arbitration when the accesses to the second slave (SLV_2) 104 are competitive is performed by the round robin method or a fixed priority method.

Figure 4:
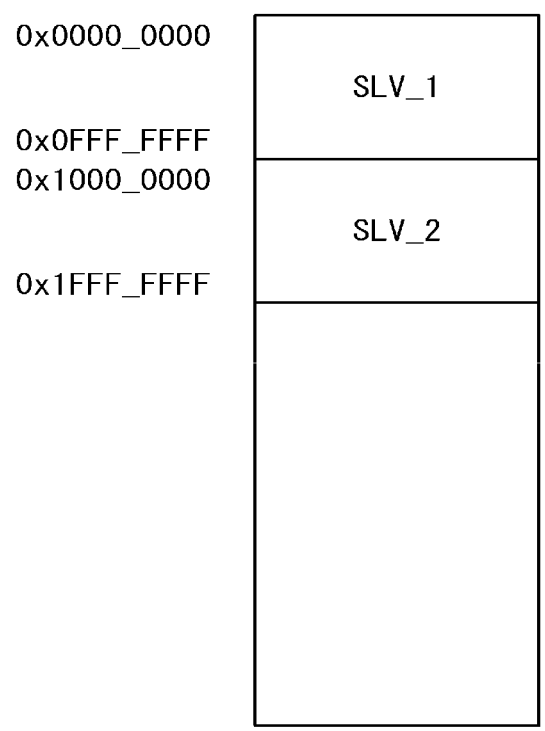
FIG. 4 is a diagram showing an address map of the semiconductor device shown in FIG. 3.
Figure 5:
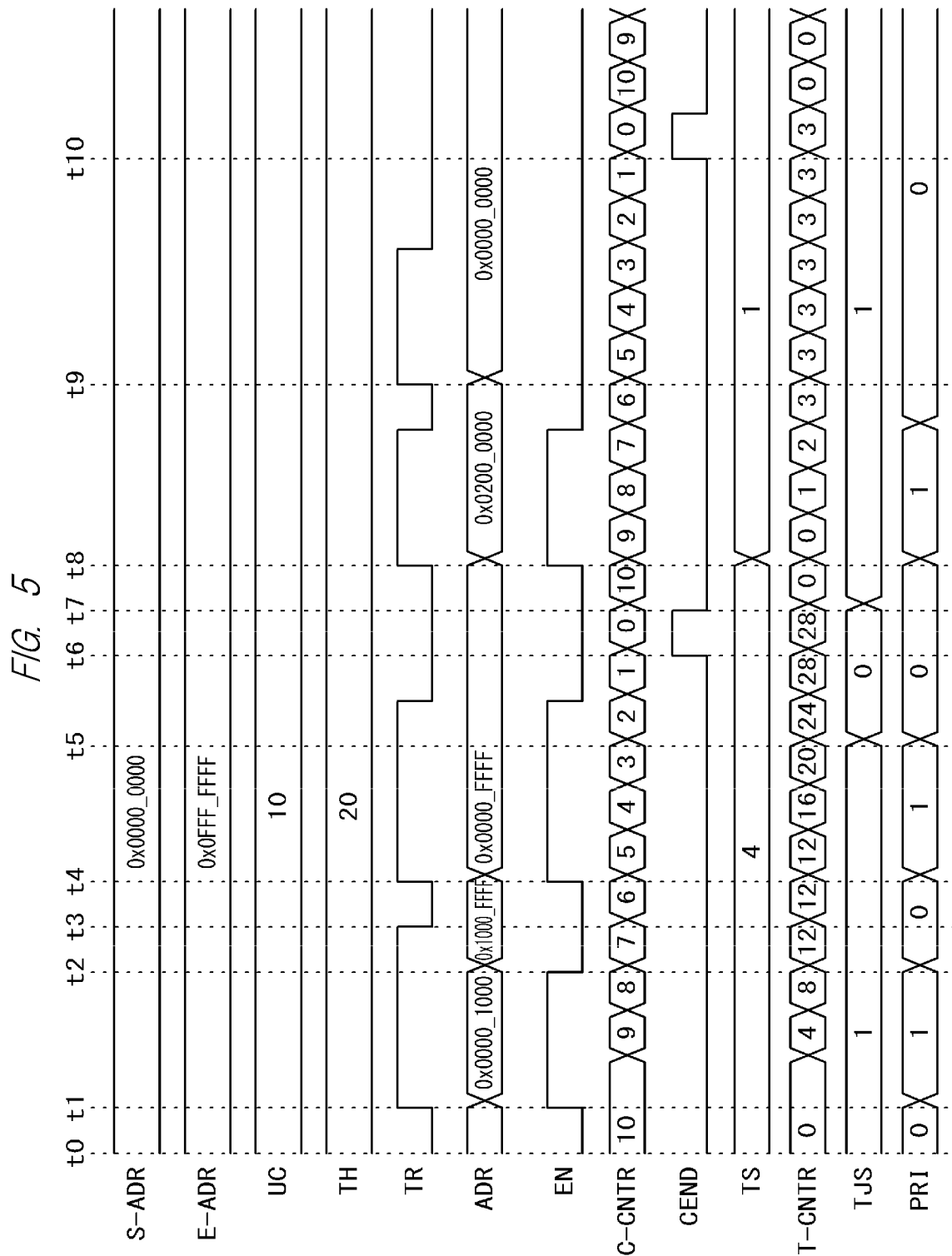
FIG. 5 is a timing chart for explaining an operation of a priority generation circuit shown in FIG. 3.

Next, an operation of the semiconductor device 10 will be described with reference to FIGS. 4 and 5. FIG. 4 is a diagram showing an address map in the first example. FIG. 5 is a timing chart for explaining an operation of the priority generation circuit.

As shown in FIG. 4, 0x0000_0000 to 0x0FFF_FFFF are set to the address of the first slave (SLV_1) 103, and 0x1000_0000 to 0x1FFF_FFFF are set to the address of the second slave (SLV_2) 104. Based on this address map, the operation will be described below for each time (t) shown in FIG. 5. Incidentally, a cycle setting register 116 is set to "10" in advance as a unitary unit cycle number (UC) by a CPU or the like that controls the entire semiconductor device 10. "20" is set as a threshold value (TH) in a threshold value setting register 117.

[Time (t0)]

The start address (S_ADR) and end address (E_ADR) of the first slave (SLV_1) 103 are inputted to the area determination circuit 111 at fixed values. The unitary unit cycle number (UC) is set to "10" by the cycle setting register 116, and "10" is preset to the cycle counter 112. Further, the threshold value (TH) is set as "20" to the transfer amount counter 114 by the threshold value setting register 117. Since the count value of the transfer amount counter 113 is "0" in an initial state and the threshold value is "20" or less, the threshold value determination circuit 114 generates "1" as a threshold value determination signal (TJS). Since the enable signal (EN) is negated, the priority determination circuit 115 sets "0" as the priority (PRTY).

[Time (t1-t2)]

The first master 101 starts the transfer and asserts the during-transfer signal (TR). The start address (S_ADR) is 0x0000_0000, the end address (E_ADR) is 0x0FFF_FFFF, and the transfer address (ADR) is 0x000_1000. Therefore, since the transfer address (ADR) indicates the first slave (SLV_1) 103, the area determination circuit 111 asserts the enable signal (EN). By asserting the first enable signal (EN), the cycle counter 112 starts 10 down counts. Further, the transfer amount counter 113 increments "4" according to the transfer size information (TS) at the time of asserting the enable signal (EN). Since the transfer amount (TV) is "4" and the threshold value is a value of "20" or less, the threshold value determination circuit 114 generates "1" as the threshold value determination signal (TJS). Since the enable signal (EN) is asserted, the priority determination circuit 115 sets "1" as the priority (PRTY).

[Time (t2-t3)]

The first master 101 changes the transfer address (ADR) to 0x1000_FFFF. Since this transfer address (ADR) is larger than 0x0FFF_FFFF of the end address (E_ADR), the area determination circuit 111 negates the enable signal (EN). This brings a stop of the count of the transfer amount counter 113. Further, the priority determination circuit 115 switches the priority (PRTY) to "0".

[Time (t4-t5)]

The first master 101 changes the transfer address (ADR) to 0x0000_FFFF again. Since this transfer address (ADR) indicates the first slave (SLV_1) 103, the area determination circuit 111 asserts the enable signal (EN). Consequently, the transfer amount counter 113 restarts counting, and the transfer amount counter 113 increments "4". Since the transfer amount (TV) is "12" that is a value smaller than "20" of the threshold value, the threshold value determination circuit 114 generates "12" as the threshold value determination signal (TJS). Since the enable signal (EN) is asserted, the priority determination circuit 115 switches the priority (PRTY) to "1".

[Time (t5-t6)]

Since the transfer amount (TV) is "24" that is a value larger than "20" of the threshold value, the threshold value determination circuit 114 generates "0" as the threshold value determination signal (TJS). The priority determination circuit 115 sets the priority (PRTY) to "0" regardless of the value of the enable signal (EN).

[Time (t6-t7)]

Since the count value of the cycle counter 112 has become "0", the cycle counter 112 asserts the count end flag (CEND).

[Time (t7-t8)]

The transfer amount counter 113 is reset by asserting the count end flag (CEND). Since the transfer amount (TV) is "0" that is a value smaller than "20" of the threshold value, the threshold value determination circuit 114 generates "1" as the threshold value determination signal (TJS). Further, "10" of the unit cycle number (UC) is preset in the cycle counter 112 again, and the cycle counter 112 starts the down count.

[Time (t8-t9)]

The first master 101 changes the transfer address (ADR) to 0x0200_0000. Since this transfer address (ADR) indicates the first slave (SLV_1) 103, the enable signal (EN) is asserted. The count of the transfer amount counter 113 is restarted, and the transfer amount counter 113 increments "1" according to the transfer size information (TS) at the time of asserting the enable signal (EN).

[Time (t10)]

The cycle counter 112 asserts the count end flag (CEND) when the value of the counter reaches "0". When the count end flag (CEND) is asserted, the transfer amount counter 113 is reset similarly to the time (t7-t8) even if the transfer amount (TV) which is the value of the transfer amount counter 113 has not reached the threshold value. Then, the initial value is preset in the cycle counter 112.

The semiconductor device 10 repeats the same operation thereafter.

The first example has one or more of the following effects.

(1) When a transfer destination address of the master matches with an address of the slave whose priority control is desired to be performed, the transfer amount is counted and the priority is generated based on the count value. This makes it possible to allot the priority to the master based on the transfer amount with the specific slave.

(2) In Patent Document 1, since the calculation is performed by using the remaining data amount and the remaining time of the master, a circuit scale of the priority generation circuit becomes large. However, the first example has a configuration of determining whether the transfer amount of the master has reached the threshold value and outputting as a priority a determination result only in transferring to the slave whose priority control is desired to be performed. Therefore, the circuit scale of the priority generation circuit therein can be made smaller than that in Patent Document 1.

Second Example

Figure 6:
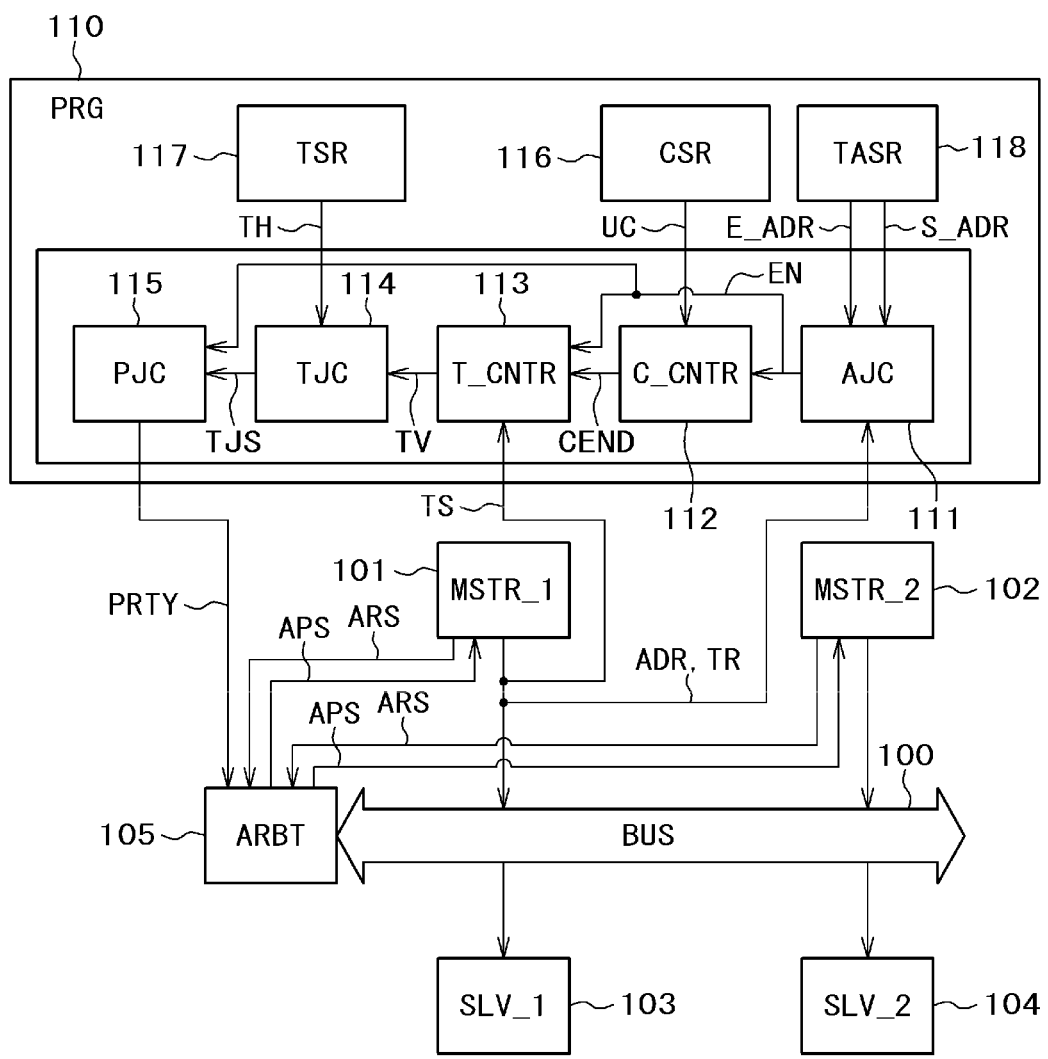
FIG. 6 is a block diagram showing a configuration of a semiconductor device according to a second example.

A configuration of a semiconductor device according to a second example will be described with reference to FIG. 6. FIG. 6 is a block diagram showing a configuration of a semiconductor device according to a second example.

A the semiconductor device 10 of a second example, a target setting register (TASR) 118 is added to the priority generation circuit of the first example. The start address (S_ADR) and end address (E_ADR) to be inputted to the area determination circuit (AJC) 111 can be set by the target setting register 118. Other configurations of the semiconductor device 10 of the second example are the same as those of the first example.

Figure 7:
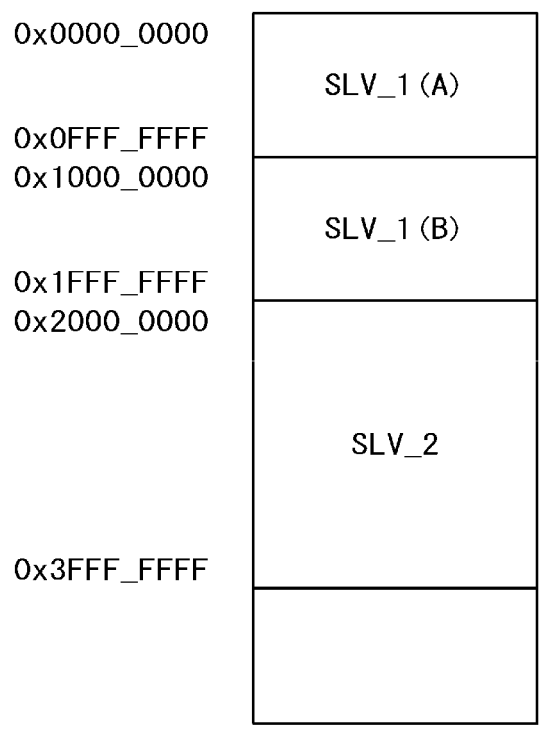
FIG. 7 is a diagram showing an address map of the semiconductor device shown in FIG. 6.
Figure 8:
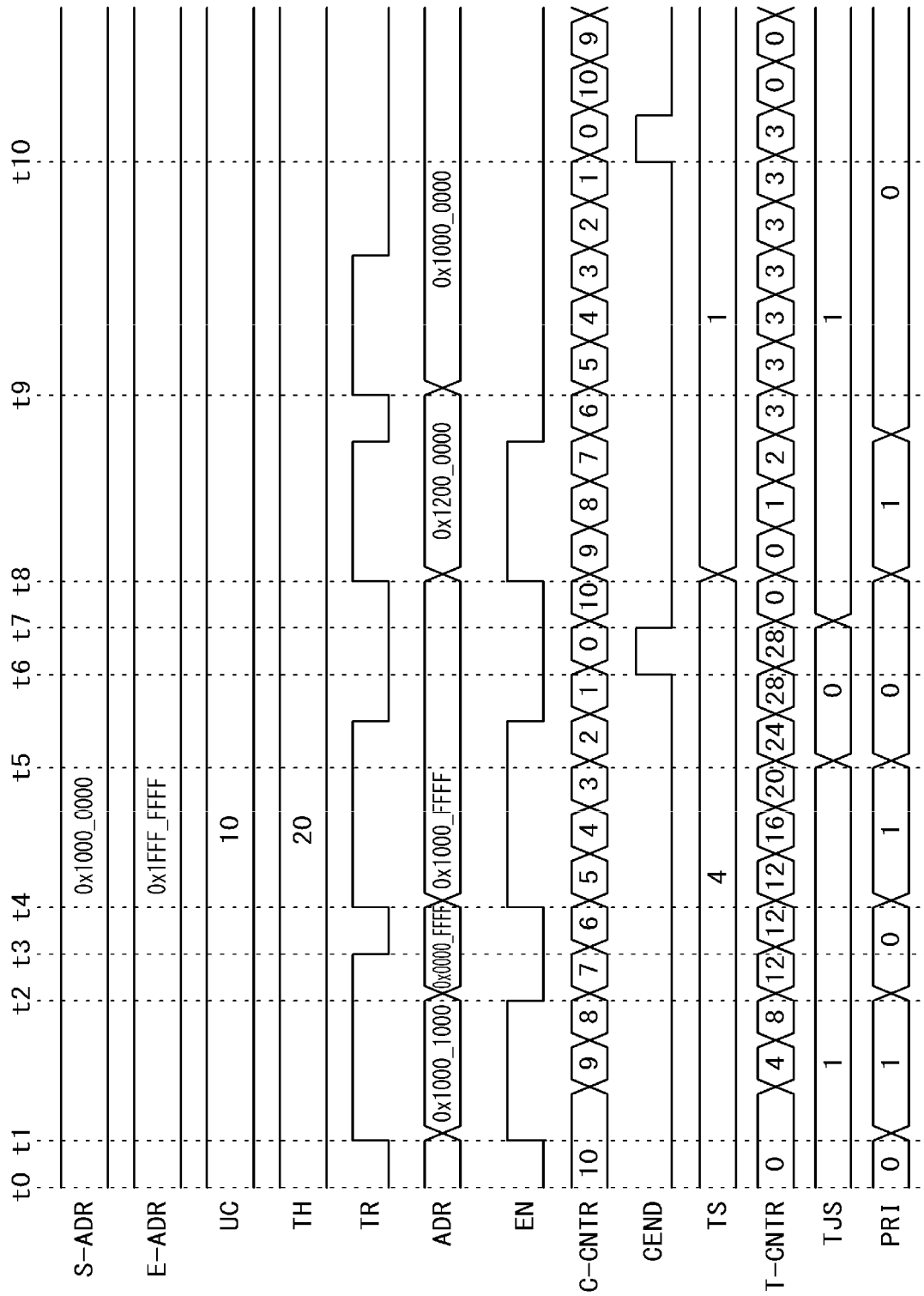
FIG. 8 is a timing chart for explaining an operation of a priority generation circuit shown in FIG. 6.

An operation of the semiconductor device 10 according to the second example will be described with reference to FIGS. 7 and 8. FIG. 7 is a diagram showing an address map in the second example. FIG. 8 is a timing chart for explaining an operation of a priority generation circuit in the second example.

As shown in FIG. 7, 0x0000_0000 to 0x1FFF_FFFF is set as the address of the first slave (SLV_1) 103, and 0x2000_0000 to 0x3FFF_FFFF is set as the address of the second slave (SLV_1) 104. Further, the address of the first slave (SLV_1) 103 is divided into an area A of 0x0000_0000 to 0x0FFF_FFFF and an area B of 0x1000_0000 to 0x1FFF_FFFF. Based on this address map, an operation of a case where the priority control in the area B of the first slave (SLV_1) 103 is performed will be described below for each time (t) shown in FIG. 8. The description of the same operation as that of the first example will be omitted. Incidentally, by a CPU or the like that controls the entire semiconductor device 10, "10" as the unitary unit cycle number (UC) is set in advance to the cycle setting register 116. "20" as the threshold value (TH) is set in the threshold value setting register 117. 0x1000_0000 as the start address (S_ADR) and 0x1FFF_FFFF as the end address (E_ADR) are in the target setting register 118, respectively.

[Time (t0)]

From the area setting register 118, 0x1000_0000 of the start address (S_ADR) and 0x1FFF_FFFF of the end address (E_ADR) are inputted to the area determination circuit 111.

[Time (t1-t2)]

The first master 101 starts the transfer and, simultaneously, asserts the during-transfer signal (TR). The start address (S_ADR) is 0x1000_0000, the end address (E_ADR) is 0x1FFF_FFFF, and the transfer address (ADR) is 0x1000_1000. Therefore, since the transfer address (ADR) indicates the area B of the first slave (SLV_1) 103, the area determination circuit 111 asserts the enable signal (EN).

[Time (t2-t3)]

The first master 101 changes the transfer address (ADR) to 0x0000_FFFF. Since this transfer address (ADR) is smaller than 0x1000_0000 of the start address (S_ADR), the area determination circuit 111 negates the enable signal (EN).

[Time (t4-t5)]

The first master 101 changes the transfer address (ADR) to 0x1000_FFFF again. Since this transfer address (ADR) indicates the area B of the first slave (SLV_1) 103, the area determination circuit 111 asserts the enable signal (EN).

According to the second example, the priority can be switched by restricting the area of the slave to an arbitrary specific address area thereof. Consequently, for example, when an address space is divided by security attribute, the switching control of the priority can be performed only in a security area or only in a non-security area.

Third Example

Figure 9:
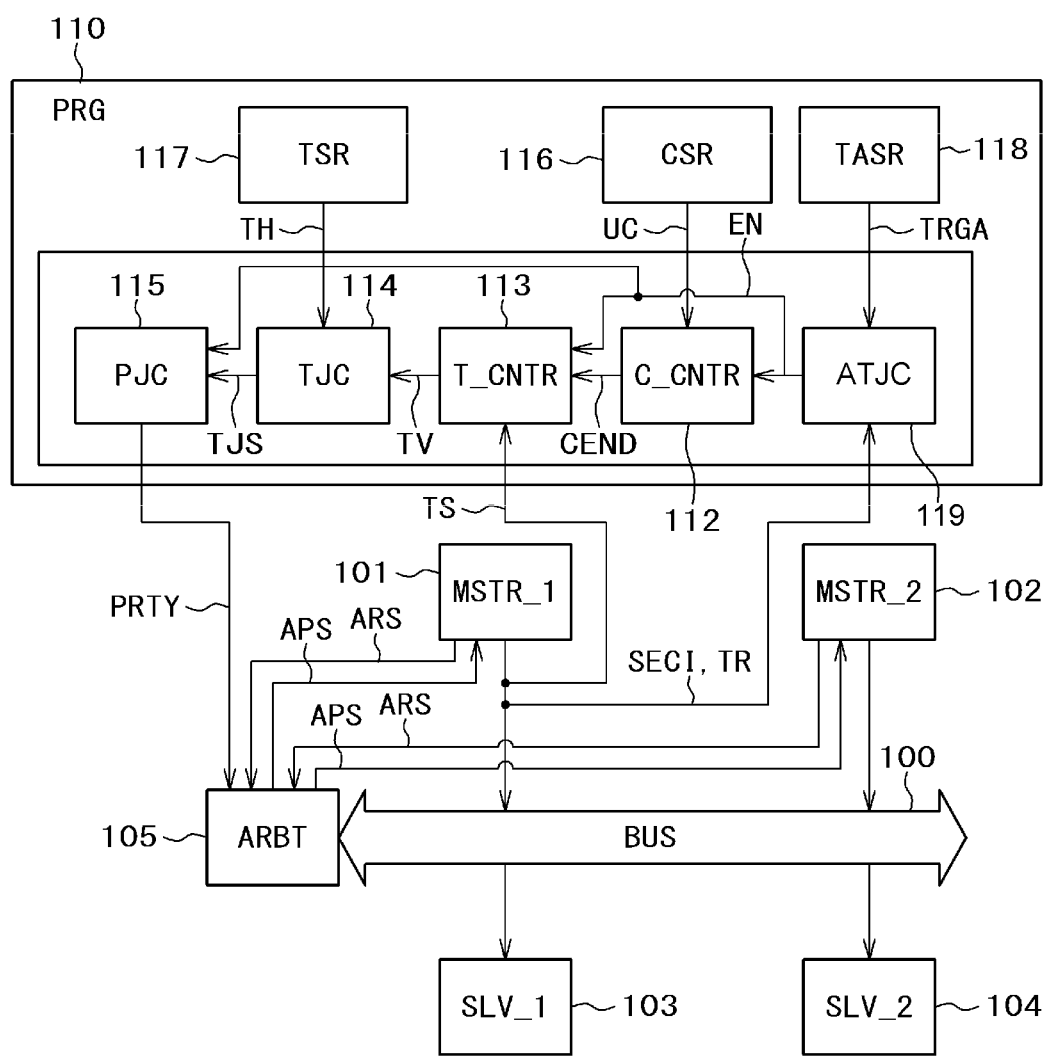
FIG. 9 is a block diagram showing a configuration of a semiconductor device according to a third example.

A configuration of a semiconductor device according to a third example will be described with reference to FIG. 9. FIG. 9 is a block diagram showing a configuration of a semiconductor device according to a third example.

A semiconductor device 10 of a third example includes an attribute determination circuit (ATJC) 119 instead of the area determination circuit (AJC) 111 of the second example. Security attribute information (SECI) is inputted from the first master 101 to the attribute determination circuit 119 instead of the transfer address (ADR). Further, target attribute (TRGA) is inputted from the target setting register 118 to the attribute determination circuit 119. Other configurations of the semiconductor device 10 of the third example are the same as those of the second example.

Figure 10:
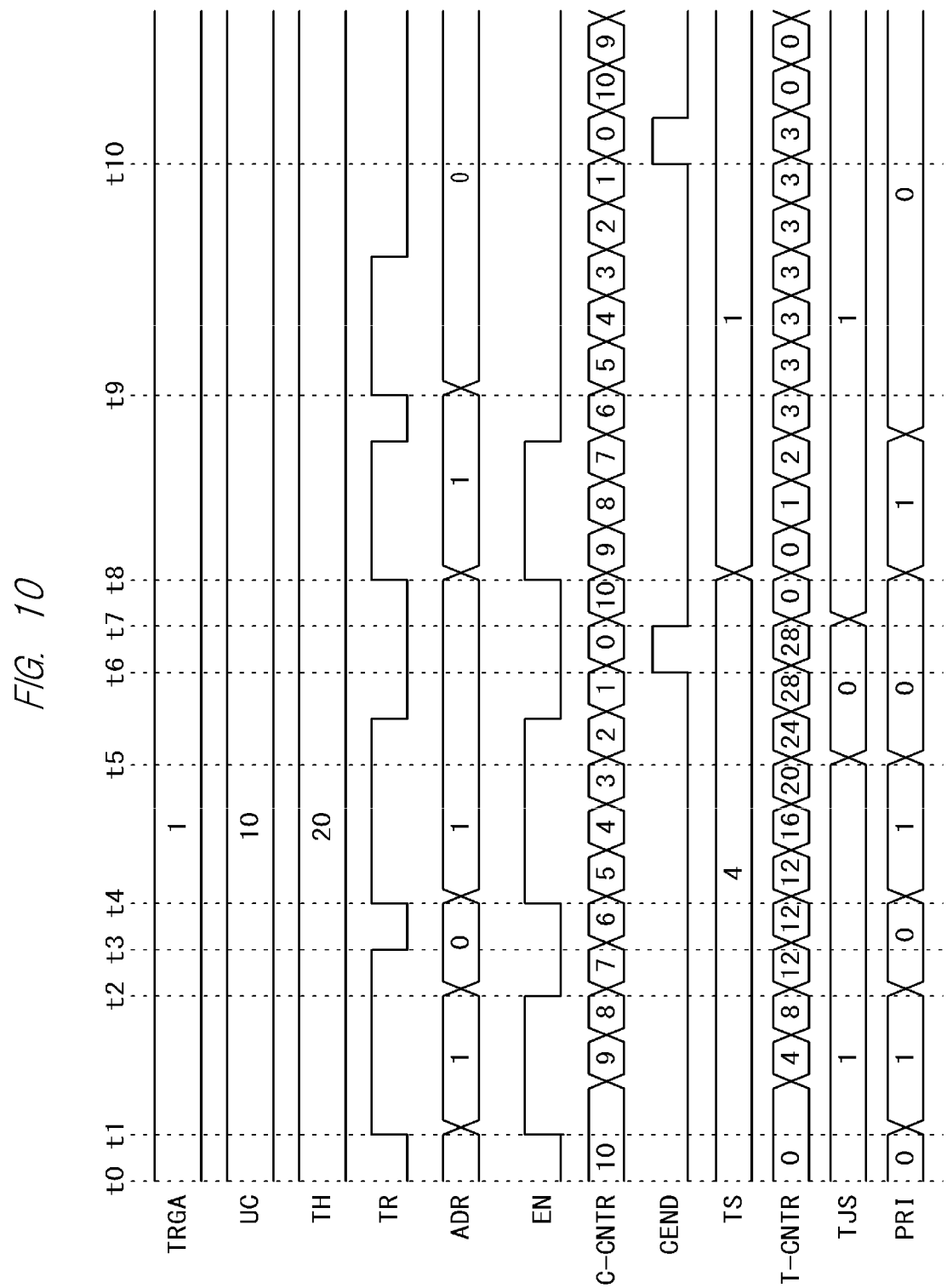
FIG. 10 is a timing chart for explaining an operation of a priority generation circuit shown in FIG. 9.

An operation of the semiconductor device 10 according to the third example will be described with reference to FIG. 10. FIG. 10 is a timing chart for explaining an operation of a priority generation circuit in the third example.

Hereinafter, the operation will be described for each time (t) shown in FIG. 10. The description of the same operation as that of the first example will be omitted. Incidentally, "10" as the unitary unit cycle number (UC) is set in advance to the cycle setting register 116 by a CPU or the like that controls the entire semiconductor device 10. "20" as the threshold value (TH) is set in the threshold value setting register 117. "1" indicating the secure as the target attribute (TRGA) is set in the target setting register 118.

[Time (t0)]

The target attribute (TRGA) is inputted to the attribute determination circuit 119 from the target setting register 118.

[Time (t1-t2)]

The first master 101 starts the transfer and, simultaneously, outputs "1" indicating that the security attribute information (SECI) of the transfer is the secure attribute. Since the security attribute information (SECI) is equal to a set value of the target attribute (TRGA) of the target setting register 118, the attribute determination circuit 119 asserts the enable signal (EN).

[Time (t2-t3)]

The first master 101 outputs "0" indicating that the security attribute information (SECI) of the transfer is a non-secure attribute. Since the security attribute information (SECI) is not equal to the set value of the target attribute (TRGA) of the target setting register 118, the attribute determination circuit 119 negates the enable signal (EN).

The third example has one or more of the following effects.

(1) The priority can be switched by limiting the security attribute of the transfer when the master performs the transfer. This makes it possible to increase the priority by limiting only the transfer of the security attribute or the transfer of the non-security attribute.

(2) Generally, since the security attribute is a signal of 1 to several bits, a circuit scale of a decoding unit can be the same as or smaller than those of the first example and the second example.

In the third example, the security attribute signal has been described as an example, but the present invention is not limited to this. For example, the bus control signal that the master outputs at the transfer is inputted to an attribution determination circuit, and the priority control other than the security attribute can be performed by making a comparison about whether its inputted value matches with a target value set by the attribute setting register.

Fourth Example

Figure 11:
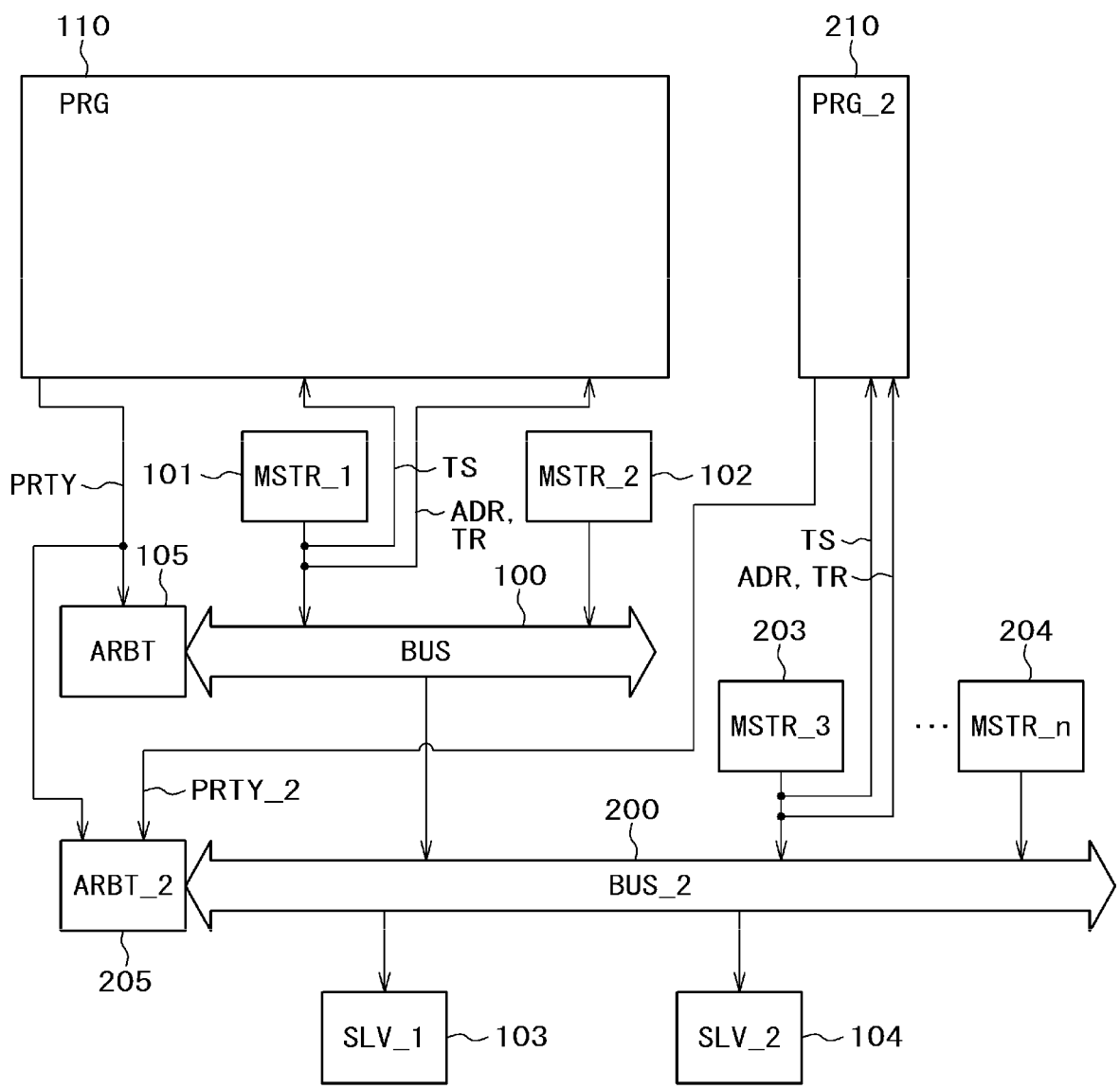
FIG. 11 is a block diagram showing a configuration of a semiconductor device according to a fourth example.

A configuration of a semiconductor device according to a fourth example will be described with reference to FIG. 11. FIG. 11 is a block diagram showing a configuration of a semiconductor device according to a fourth example.

In a semiconductor device 10 in a fourth example, the number of masters is increased to n as compared with the first example, buses are configured in multiple stages, and priority control is performed to a specific slave similarly to the first example. That is, the semiconductor device 10 in the fourth example further includes: a second bus 200; (n−2) masters of the third master (MSTR_3) 203 to the nth master (MSTR_n) 204; a second arbitration circuit (ARBT_2) 205; and a second priority generation circuit (PRG_2) 210. Here, n is an integer of 4 or more. FIG. 11 shows an example in which priority control is performed with respect to respective specific slaves of a first master (MSTR_1) 101 connected to the bus 100 and a third master 203 connected to a second bus 200. The first master 101 accesses the first slave (SLV_1) via the bus 100 and the second bus 200. Incidentally, FIG. 11 omits access request signals and access permission signals, which are input/output signals of each master and the arbitration circuit.

The priority generation circuit 110 for the first master 101 generates a priority (PRTY) in accessing a specific slave in the same manner as in the first example, and inputs it to the arbitration circuit 105 and the second arbitration circuit (ARBT_2) 205. The second priority generation circuit 210 for the third master 203 has the same configuration as that of the priority generation circuit 110 and inputs, to the second arbitration circuit 205, the priority (PRTY) generated in the same manner as in the first example.

When the priority (PRTY) is "1", the arbitration circuit 105 preferentially issues the access permission of the bus 100 to the first master 101. Further, when the priority (PRTY) is "0", the arbitration circuit 105 issues access permission to the second master (MASR_2) 102, or issues access permission by the round robin method.

The second arbitration circuit 205 preferentially issues the access permission of the second bus 200 to the first master 101 when the priority (PRTY) is "1", that is, the access permission of the bus 100 is issued to the first master 101. Further, when the priority (PRTY_2) is "1", the second arbitration circuit 205 preferentially issues the access permission of the second bus 200 to the third master 203.

However, when both the priority (PRTY) and the priority (PRTY_2) are "1", the second arbitration circuit 205 performs any of the following:
  (a) preferentially issuing the access permission of the second bus 200 to the first master 101;
  (b) preferentially issuing the access permission of the second bus 200 to the third master 203; and
  (c) issuing the access permission of the second bus 200 to the first master 101 or third master 203 by the round robin method.

When both the priority (PRTY) and the priority (PRTY_2) are "0", the second arbitration circuit 205 decides in advance the master, to which the access permission is preferentially issued, or is arbitrated by the round robin method similarly to a case where the priority (PRTY) is "1".

In the fourth example, the priority generation circuit is connected to the first master 101 and the third master 203, but the number of masters to which the priority generation circuit is connected is not limited. Further, this embodiment has been set to a two-step configuration of the bus 100 and the second bus 200, but the number of stages of the bus is not limited and the number of masters connected to each bus is not limited, either. Further, the embodiment has shown an example in which the first slave 103 and the second slave 104 are connected to the second bus 200 is shown, but the number of slaves is not limited, either. The present embodiment has described an example in which the same priority generation circuit as in the first example is used, but may use the same priority generation circuit as that of the second example or third example.

As described above, the disclosure made by the present disclosers has been specifically described above based on the embodiments and examples, but the present disclosure is not limited to the above embodiments and examples and, needless to say, can variously be modified.

What is claimed is:

1. A semiconductor device comprising:
a first master device and a second master device;
a slave device to be accessed by the first master device and the second master device;
a bus connecting the first master device, the second master device, and the slave device; and
a priority generation circuit that generates a priority associated with the first master device without generating a priority associated with the second master device, wherein the priority associated with the first master device indicates high based on determining that a transferred data amount between the first master device and the slave device is smaller than a threshold amount, and wherein the priority associated with the first master device indicates low based on determining that the transferred amount between the first master device and the slave is equal to or larger than the threshold amount; and
an arbitration circuit that performs an arbitration based on a priority when the first master device and the second master device simultaneously issue access requests to the slave device, wherein the arbitration circuit is configured to issue use permission of the bus to the first master device when the priority indicates that the priority of the first master device is high,
wherein the priority generation circuit includes a target determination circuit configured to assert an enable signal when a transfer address of the first master device matches an address of the slave device, and
wherein the semiconductor device further comprises a register, address information to be compared by the target determination circuit being set in the register.

2. A semiconductor device comprising:
a first master device and a second master device;
a slave device to be accessed by the first master device and the second master device;
a bus connecting the first master device, the second master device, and the slave device; and
a priority generation circuit that generates a priority associated with the first master device without generating a priority associated with the second master device, wherein the priority associated with the first master device indicates high based on determining that a transferred data amount between the first master device and the slave device is smaller than a threshold amount, and wherein the priority associated with the first master device indicates low based on determining that the transferred amount between the first master device and the slave is equal to or larger than the threshold amount; and
an arbitration circuit that performs an arbitration based on a priority when the first master device and the second master device simultaneously issue access requests to the slave device, wherein the arbitration circuit is configured to issue use permission of the bus to the first master device when the priority indicates that the priority of the first master device is high,
wherein the priority generation circuit includes a target determination circuit configured to assert an enable signal when a transfer address of the first master device matches an address of the slave device, and
wherein the target determination circuit is configured to assert the enable signal when transfer attribute information in being transferred by the first master device matches with predetermined information.

3. The semiconductor device according to claim 2, wherein the priority generation circuit includes a target determination circuit configured to assert an enable signal when a transfer address of the first master device matches an address of the slave device, and
wherein the semiconductor device further comprises a register, the predetermined information to be compared with the target determination circuit being set in the register.

4. The semiconductor device according to claim 3, wherein the transfer attribute information is a security attribute.

5. A semiconductor device comprising:
a first master device and a second master device;
a slave device to be accessed by the first master device and the second master device;

a bus connecting the first master device, the second master device, and the slave device; and a priority generation circuit that generates a priority associated with the first master device without generating a priority associated with the second master device, wherein the priority associated with the first master device indicates high based on determining that a transferred data amount between the first master device and the slave device is smaller than a threshold amount, and wherein the priority associated with the first master device indicates low based on determining that the transferred amount between the first master device and the slave is equal to or larger than the threshold amount;

an arbitration circuit that performs an arbitration based on a priority when the first master device and the second master device simultaneously issue access requests to the slave device, wherein the arbitration circuit is configured to issue use permission of the bus to the first master device when the priority indicates that the priority of the first master device is high;

a third master device;

a second bus connected to the third master device;

a second priority generation circuit connected to the third master device; and a second arbitration circuit configured to issue use permission of the second bus based on a priority generated by the second priority generation circuit, wherein the master device is connected to the slave device via the bus and the second bus, and wherein the second arbitration circuit is configured to issue the use permission of the second bus based on the priority generated by the priority generation circuit and the priority generated by the second priority generation circuit.

\* \* \* \* \*